D. C. WALTERS.
Hopper-Attachment for Grinding-Mills.
No. 73,142. Patented Jan. 7, 1868.
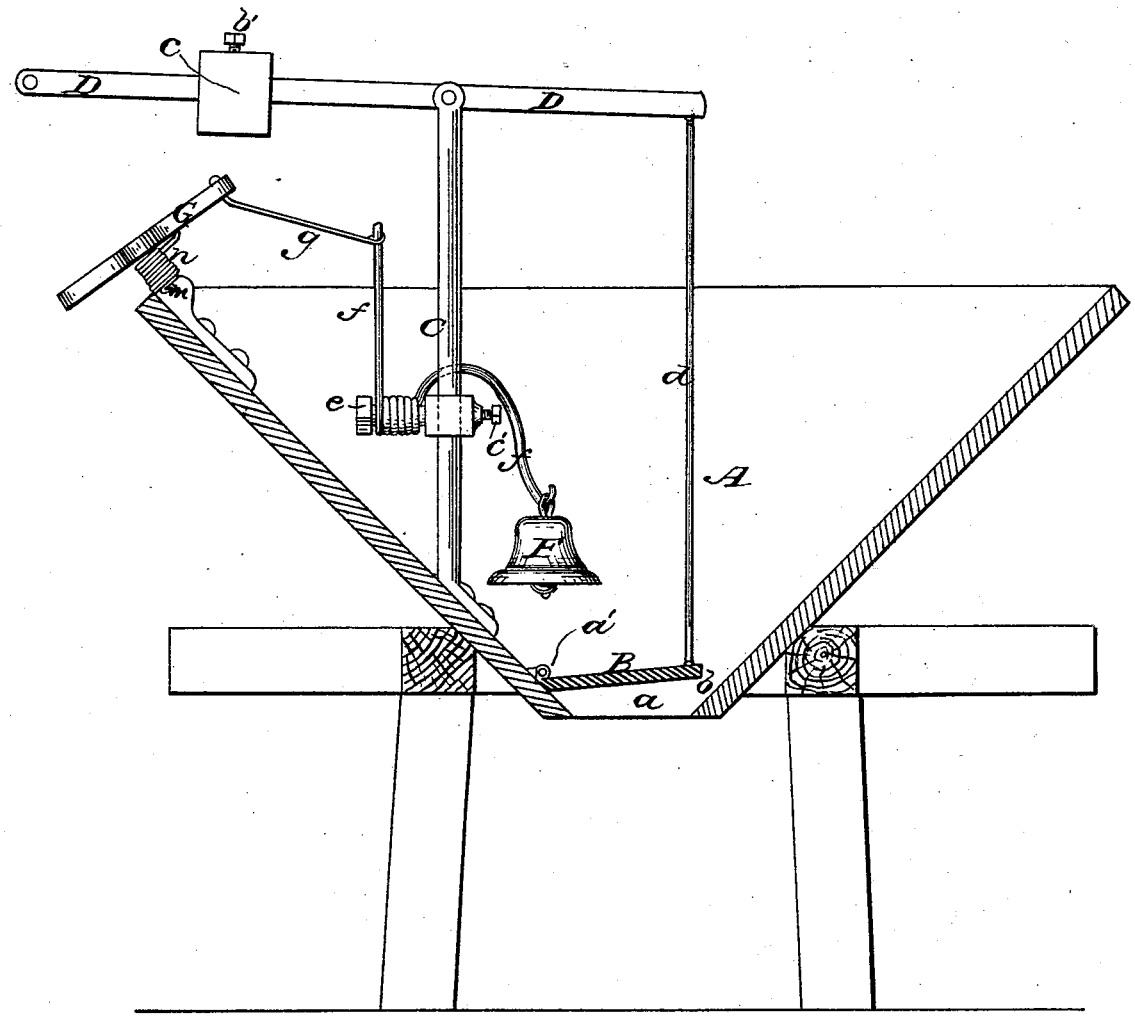
Witnesses:
JrCoombs
A LeClerc
Inventor
D. C. Walters

United States Patent Office.

DAVID C. WALTERS, OF WARSAW, INDIANA.

Letters Patent No. 73,142, dated January 7, 1868.

---

IMPROVEMENT IN ATTACHMENTS FOR HOPPERS OF GRINDING-MILLS.

---

The Schedule referred to in these Letters Patent and making part of the same.

---

TO ALL WHOM IT MAY CONCERN:

Be it known that I, DAVID C. WALTERS, of Warsaw, in the county of Kosciusko, and State of Indiana, have invented certain new and useful Improvements in Attachments for Hoppers of Grinding-Mills; and I do hereby declare that the following is a full, clear, and exact description of the same, reference being had to the accompanying drawing, making a portion of this specification, which is a vertical transverse section of a hopper fitted with my invention.

This invention is designed for grist and other mills, and its object is to provide an efficient automatic means whereby notice may be given to the miller or attendant when the grain is nearly exhausted from the hopper, and whereby, furthermore, the hopper may be automatically replenished from a suitable reservoir, when thus emptied.

The invention consists in a bell, operated by any suitable device, and so arranged within the hopper that, when surrounded by the grain, it will remain silent, but when uncovered, by the exhaustion of the grain from the hopper, will be sounded to apprise the attendant of such exhaustion.

The invention further consists in a loaded lever and connecting-rod, so combined with a movable float, arranged in the bottom of the hopper, that the lever aforesaid, being connected with suitable mechanism for discharging grain from a bin or reservoir to the said hopper, will be permitted to operate by the exhaustion of grain from the hopper to secure the re-filling of the latter.

The invention further consists in certain novel means, whereby compactness and simplicity of construction are secured.

To enable others to understand the construction and operation of my invention, I will proceed to describe it with reference to the drawings.

The hopper A, of any suitable form, is arranged in relation with the millstones or grinding-apparatus in the usual or in any appropriate manner, and has situated over its orifice $a$, a float, B, hinged or pivoted at one edge to the side of the hopper, as shown at $a'$, and so situated that, when forced downward and resting upon the lower portions of the flaring sides of the hopper, as shown in the drawing, a space, $b$, will be left at that edge thereof, opposite the hinged or pivoted edge just mentioned, the said space constituting the opening through which the grain passes from the hopper to the millstones or grinding-devices. Provided within the hopper is an upright standard, C, to the upper end of which is pivoted a horizontal lever, D, the outer arm of which is loaded with an adjustable weight, C, which may be retained at any desired distance from the pivot or fulcrum of the lever by a set-screw, $b'$, the inner end of the said lever being connected by a rod, $d$, with the free edge of the float B. Placed upon the standard C, and held at any desired point thereon by a set-screw, $c'$, is an adjustable annular block, E, furnished with an arm, $e$, around which is coiled a wire, $f$, one end of which extends towards the bottom of the hopper, and has attached to it a bell, F, and the other end of which, projecting upward, is connected by a rod, $g$, with a bar, G, pivoted by a stem, $m$, to one side of the upper part of the hopper, the said stem having coiled around it a spring, $n$, which tends to move the bar in one direction, after being thrown in an opposite direction by any suitable means or appliances, which may consist in a device connected with some moving part of the mill-machinery.

The hopper being filled with grain, the bell is covered up thereby, and consequently prevented from ringing, although a continuous vibratory movement be communicated to the bar G, by the means just hereinbefore mentioned, the upright portion of the wire $f$ and the rod $g$ being sufficiently flexible to permit such movement of the bar, notwithstanding the stationary position of the bell. When all or nearly all of the contents of the hopper have passed out through the space or opening $b$ to the millstones, the bell, being uncovered, is rung by the movement of the bar G connected therewith, and thus automatically apprises the miller or attendant that the hopper is nearly or quite empty, as the case may be.

By adjusting the bell at a greater or less distance from the bottom of the hopper, by raising or lowering the annular block E upon the standard, the bell may in like manner be enabled to ring while any required proportion of grain remains in the hopper.

When the passage of the grain from the hopper has released the float B from the downward pressure thereof, the loaded end of the lever D is allowed to descend, and the said lever, being connected by a cord, rod, or other suitable appliance, with suitable means for admitting grain to the hopper from an appropriate bin or reservoir, the hopper is automatically refilled by adjusting the weight $c$ at a greater or less distance from the pivot or fulcrum of the lever, as hereinbefore mentioned. The lever may be adjusted to tilt when the grain upon the float falls below any given weight.

What I claim as my invention, and desire to secure by Letters Patent, is—

1. A bell, so operated and arranged within the hopper that, when surrounded by the grain, it will be held stationary, but when uncovered will be caused to ring, substantially as and for the purpose specified.

2. The loaded lever D and connecting-rod $d$, so combined with the float B, in the bottom of the hopper, that the said lever may operate when the float is released from the weight of grain in the hopper, substantially as and for the purpose specified.

3. The bell F, wire $f$, and adjustable annular block E, in combination with the standard C, rod $g$, and bar G, substantially as and for the purpose specified.

DAVID C. WALTERS.

Witnesses:
WM. B. FUNK,
JOSEPH A. FUNK.